United States Patent [19]

Yamamoto et al.

[11] 4,422,689
[45] Dec. 27, 1983

[54] LOCKING DEVICE FOR DETACHABLE PANEL OF VEHICLE ROOFS

[75] Inventors: Junji Yamamoto, Nagoya; Noboru Kanou; Masayuki Usami, both of Toyota, all of Japan

[73] Assignees: Aisin Seiki Kabushiki Kaisha, Kariya; Toyota Jidosha Kogyo Kabushiki Kaisha, Toyota, both of Japan

[21] Appl. No.: 224,844

[22] Filed: Jan. 13, 1981

[30] Foreign Application Priority Data

Jan. 19, 1980 [JP] Japan ................................... 55-4953

[51] Int. Cl.³ ................................................ B60J 7/08
[52] U.S. Cl. ...................................... 296/224; 49/465; 292/263; 292/DIG. 73
[58] Field of Search ............... 296/215, 216, 218, 221, 296/224; 308/26, 36, 37, 388, 394; 292/233, 263, DIG. 73; 16/380, 386, 287; 49/465

[56] References Cited

U.S. PATENT DOCUMENTS

| | | | |
|---|---|---|---|
| 279,379 | 6/1983 | Hall | 49/388 |
| 1,824,015 | 9/1931 | Green | 49/388 |
| 4,005,901 | 2/1977 | Lutke et al. | 296/224 |
| 4,126,352 | 11/1978 | Vogel | 296/224 |

FOREIGN PATENT DOCUMENTS 1492333  11/1977  United Kingdom .

*Primary Examiner*—Robert B. Reeves
*Assistant Examiner*—Dennis Pedder
*Attorney, Agent, or Firm*—Finnegan, Henderson, Farabow, Garrett & Dunner

[57] ABSTRACT

A locking device comprises a lever pivotally mounted to a panel which is detachably fitted in a roof opening of automotive vehicles, a stationary body fixed to the vehicle roof and provided with a pair of parallel arms each having a hole therein, and a link mechanism including a stationary bracket fixed to the lever, a pair of links pivoted to the bracket and each having a pin for fitting in the hole in the arm and a spring interposed between the links to urge the links to move in opposite directions. The resilient engagement of the pins of the mechanism with the holes in the arms of the stationary body will avoid any rattle caused between the detachable panel and the vehicle roof.

4 Claims, 7 Drawing Figures

LOCKING DEVICE FOR DETACHABLE PANEL OF VEHICLE ROOFS

BACKGROUND OF THE INVENTION

1. Field of the Invention

The present invention relates generally to a detachable roof panel fitted in a roof opening of vehicles such as automobiles and more particularly to a locking device for keeping the position of the detachable panel in the partially open or the closed state.

2. Description of the Prior Art

The conventional locking device for such a detachable panel comprises a lever pivotally mounted to the rear edge of the detachable panel and a stationary body fixedly secured to the vehicle roof. The lever is pivotally connected to the stationary body by means of a link mechanism to thereby allow the lever to rotate with respect to the stationary body. The conventional locking device is, however, insufficient for ensuring firm connection between the link mechanism and the stationary body. That is, one of the conventional drawbacks is that the connection or engagement of the link mechanism with the stationary body may be loose to thereby produce an objectionable rattling noise during driving.

SUMMARY OF THE INVENTION

It is, therefore, a primary object of the invention to provide a locking device for a detachable panel of vehicles which will obviate the conventional drawbacks of the prior art.

It is another object of the invention to provide a locking device for a detachable panel of vehicles which will ensure firm connection between the constituent elements thereof to thereby avoid any rattle.

To achieve the objects and advantages of the invention, the locking device comprises a lever pivotally mounted to the rear edge of a panel which is hinged at the front edge thereof to the vehicle roof, a stationary body secured to the vehicle roof and having a pair of parallel arms provided with holes therein, a link mechanism pivotally mounted on the lever and having a pair of pins urged to move in opposite directions by means of a spring interposed therebetween. Accordingly, the pins may be resiliently fitted in the holes on the arms of the stationary body to thereby absorb any vibration or rattle caused between the link mechanism and the stationary body.

The other objects, advantages and features of the invention will be apparent from the following description with reference to the accompanying drawings.

DETAILED DESCRIPTION OF THE PREFERRED EMBODIMENT

Reference will now be made in detail to the present preferred embodiment of the invention, an example of which is illustrated in the accompanying drawings.

Figure 1:
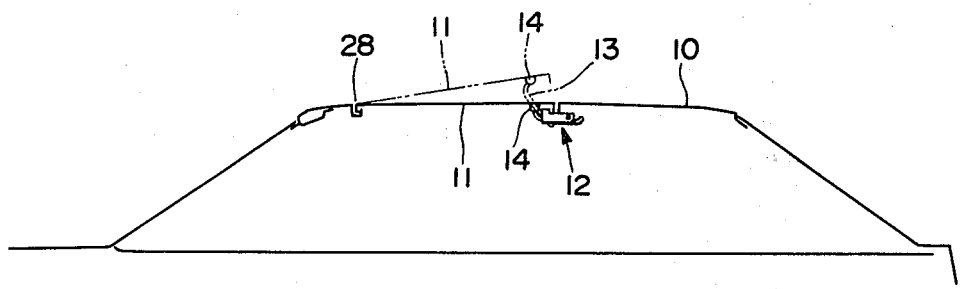
FIG. 1 is a schematic view of a vehicle roof incorporating a locking device in accordance with the present invention.

With particular reference to FIG. 1, a vehicle roof 10 includes a detachable panel 11 located generally in the front portion of the vehicle. The panel 11 may be opened by rotation up to the position shown by the chain line configuration and may be locked by means of a locking device 12 which is more specifically described hereinbelow with reference to FIGS. 2 and 3.

The locking device 12 includes a lever 13 pivotally connected to a pair of brackets 14 for attachment to the rear edge of panel 11. Each bracket 14 is provided with a hole 15 through which any suitable pin or bolt, not shown, passes. The locking device 12 further includes a stationary body 16 securely fixed to the vehicle roof 10 by bolts, not shown, which pass through holes 17, 17 provided thereon. The stationary body 16 and the brackets 14 and thus panel 11, are operatively connected to each other through means of the lever 13 and a pair of crank-shaped links 18, 18.

More particularly, the lever 13 is pivoted at the left end thereof (FIG. 2) to the brackets 14 by shafts 19, 19. The links 18, 18 are pivotally connected to an intermediate bracket 20 which is securely fitted to the lever 13. Each link 18 includes a hollow hub 21 in which a common shaft 22 is slidably mounted and links 18 are urged to move in opposite directions by a helical spring 23 interposed therebetween. In the position as illustrated in FIG. 3, the spring 23 engages at opposite ends thereof with the inner walls of the intermediate bracket 20 thereby being prevented from further stretching.

Figure 2:
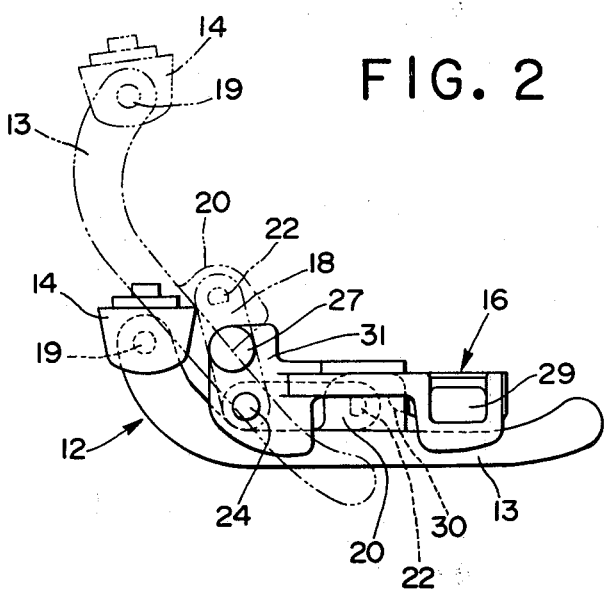
FIG. 2 is a side view of the locking device of FIG. 1 showing the different positions thereof by the solid and the chain line configurations.
Figure 3:
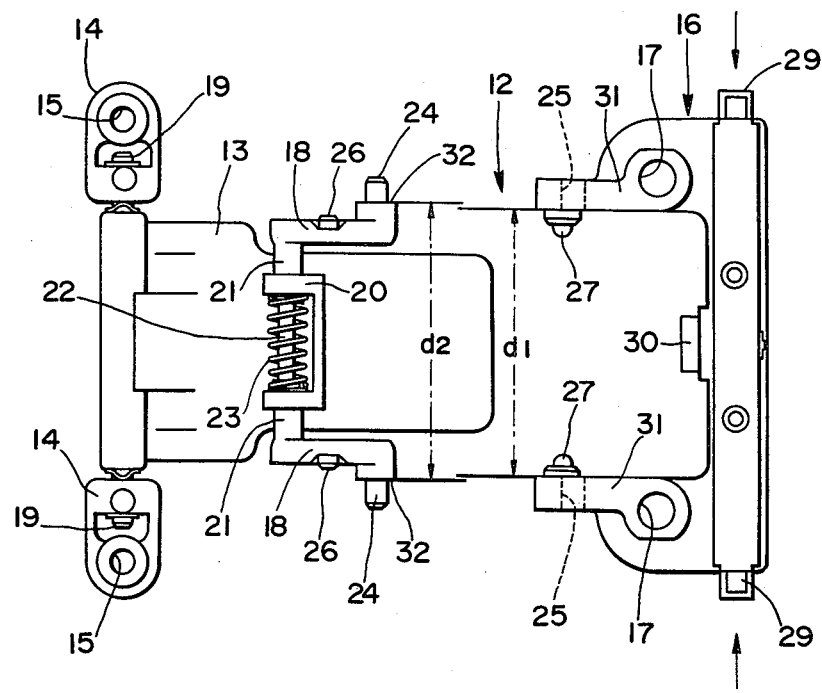
FIG. 3 is a plan view of the locking device of FIG. 1 in the free position thereof before constituent elements thereof are completely assembled with each other.

Each link 18 is provided with a pin 24 which is to be rotatably supported in a hole 25 of the body 16 when the locking device 12 is completely assembled as shown in FIG. 2, and with a recess 26 which is to be engaged with an inward projecting pin or stopper 27 resiliently mounted in the body 16. Each pin 27 is urged to project by a spring (not shown) as seen in FIG. 3 but may be retracted against the spring force. Once the pins 27, 27 engage the recesses 26, the panel 11 will be kept at the position as illustrated by the chain line configuration of FIG. 2. That is, the downward movement of the right tip of the lever 13, as viewed in FIG. 2, causes the attachment brackets 14 to move up to the position denoted by the chain line configuration by the linking mechanism comprising the lever 13, the links 18, 18, the panel 11 and the vehicle roof 10. Thus, the panel 11 is rotated at the front edge thereof around a hinge 28 provided at the front portion of the vehicle roof 10 to thereby occupy the partially open position as shown by the chain line in FIG. 1. Such partially open position of the panel 11 is maintained by the engagement of the pins 27, 27 with the recesses 26, 26.

The clockwise rotation of the panel 11 around the hinge 28 causes the pins 27, 27 to release from the recesses 26, 26 thereby permitting the panel 11 to occupy the closed position as shown by the solid line configuration in FIG. 1. The stationary body 16 is provided at each lateral edge thereof with a knob 29 which is axially movable against a spring (not shown) interposed between the two knobs 29, 29. The spring also urges an intermediate knob 30 which is mounted at the intermediate portion of the body 16 movably against the spring. When one or both of the knobs 29, 29 is pressed in the direction indicated by the arrows in FIG. 3, the intermediate knob 30 is retracted within the body 16 to thereby permit the right tip of the lever 13 to pass. The release of the knobs 29, 29 causes the intermediate knob 30 to project due to the spring force thereby keeping the panel 11 at the closed position.

When the roof panel 11 is to be fully opened, the links 18, 18 are moved inward to approach each other against the helical spring 23, to thereby disengage the pins 24, 24 from the holes 25, 25 in the arm 31, 31. Thus, the links 18, 18 may be removed from the stationary body 16. The panel 11 is detachable from the hinge 28 in a well-known manner.

In the free condition of the locking device 12 before being completely assembled, as seen in FIG. 3, the distance d1 between the opposite inner walls of arms 31, 31 of the stationary body 16 is somewhat smaller than the distance d2 between seating faces 32, 32 of the pins 24, 24 in links 18, 18. In other words, the links 18, 18 are most separated from each other by the spring 23 to make the distance d2 somewhat larger than the distance d1 at the free condition of the locking device 12. Accordingly, after the locking device 12 is completely assembled by engagement of the pins 24, 24 with the holes 25, 25, the helical spring 23 is compressed in accordance with the difference between the distances d1 and d2 to thereby allow the seating faces 32, 32 to resiliently lie adjacent the inner walls of the arms 31, 31 of the stationary body 16. As a result, any possible rattle may be avoided.

It wil be seen that the connection or engagement of the pins 24, 24 with the holes 25, 25 may be variously practiced to ensure the effects of the invention.

Figure 4A:
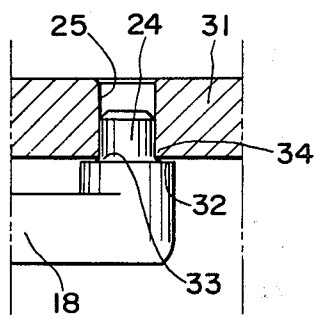
FIGS. 4(a) to 4(d) are cross-sectional views showing modifications of one portion of the locking device in an enlarged scale.
Figure 4B:
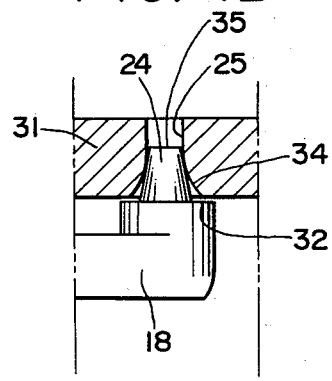
Figure 4C:
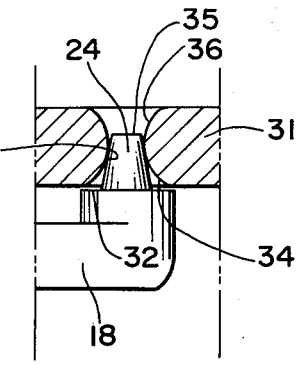
Figure 4D:
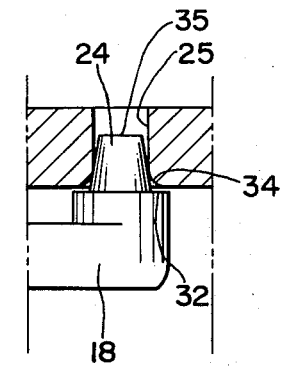

In FIG. 4(a), for instance, the pins 24 is rounded longitudinally, as shown in the Figure at a root portion 33 thereof which will be thus engaged with an inner periphery 34 of the hole 25 of the arm 31 in linear contact fashion. It is to be understood that such linear contact between the pin 24 and the hole 25 is more effective than face contact therebetween in reducing rattle. Therefore, the pin 24 may be tapered from the seating face 32 to a tip 35 thereof as seen in FIGS. 4(b) to 4(d) wherein seating faces 32, 32 are spaced from the inner walls of arms 31, 31 by a slight gap, as shown. In FIG. 4(b), the inner periphery 34 of the hole 25 is rounded to allow the pin 24 to engage therewith at the portion adjacent the tip 35. The hole 25 may be rounded not only at the inner periphery 34 but also at an outer periphery 36 thereof as illustrated in FIG. 4(c). In FIG. 4(d), the inner periphery 34 of the hole 25 is rounded to allow the pin 24 to engage therewith at the portion adjacent the seating face 32 thereof.

Obviously, many modifications and improvements are possible in the light of the above teaching. Therefore, the scope and the spirit of the present invention should be construed in accordance with the appended claims as follows:

What is claimed is:

1. A locking device for a panel adapted to be detachably fitted in an opening of a vehicle roof, the panel being hinged at a front edge thereof to the vehicle roof, comprising:
    (a) a lever pivotally mounted on the detachable panel near a rear edge of said panel;
    (b) a stationary body securely fixed to the underside of the vehicle roof and having a pair of parallel, spaced-apart arms, each arm having an opening, said openings generally facing one another; and
    (c) a link mechanism having a bracket securely fixed to said lever and having a pair of links, each link having one of its ends pivoted to said bracket and having a seating face at its other end and a pivot pin projecting from said seating face and adapted to be pivotally and releasably mounted in said opening in one of said arms, said links being resiliently biased in opposite directions such that said pivot pins are resiliently biased away from one another, each of said pivot pins being tapered from the portion thereof adjoining said seating face to its tip, and at least a portion of the interior surface of each of said openings being arcuate, when viewed in longitudinal cross section, for permitting linear engagement of each of said pins with said interior surface of an individual one of said openings, whereby said links are adapted to be resiliently mounted on said stationary body in a substantially rattle-free manner.

2. A locking device as claimed in claim 1, wherein said interior surface of each of said openings is arcuate in such a manner as to permit linear engagement of each of said pins with said interior surface of an individual one of said openings at a location on said pin adjacent its tip.

3. A locking device as claimed in claim 1, wherein said interior surface of each of said openings is arcuate in such manner as to permit linear engagement of each of said pins with said interior surface of an individual one of said openings at a location on said pin adjacent said seating face.

4. A locking device as claimed in claim 1, wherein each of said openings further comprises an interior surface portion which is arcuate, when viewed in longitudinal cross section, at a location beyond the location of said linear engagement.

* * * * *